Oct. 29, 1963 R. E. MOORE 3,108,816
MECHANICAL SEALING STRUCTURE FOR ROTATING SHAFTS
Filed April 9, 1958
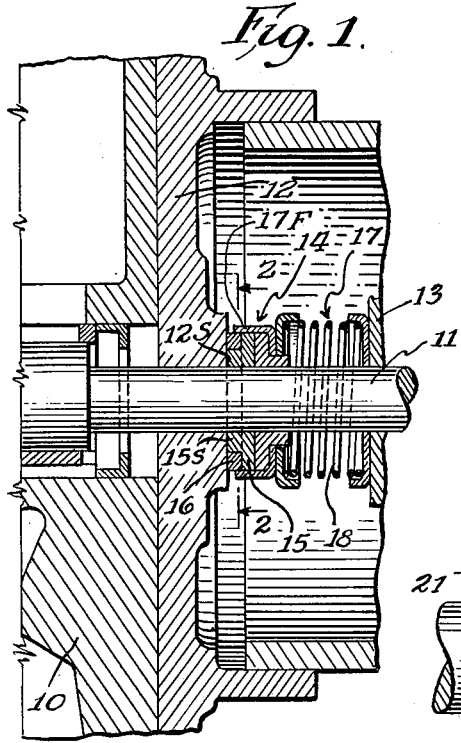
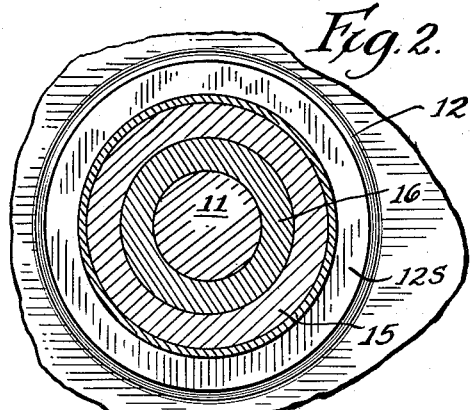
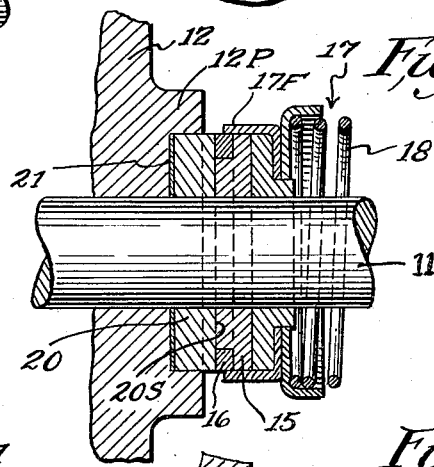
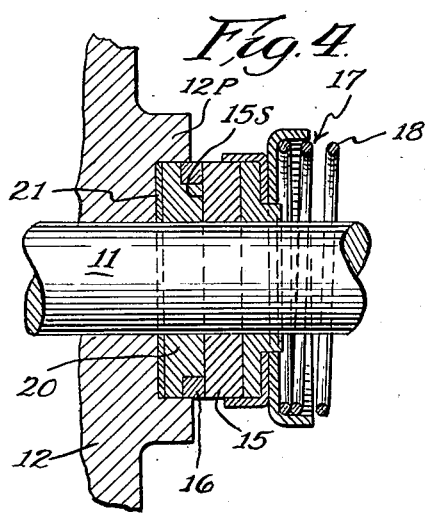
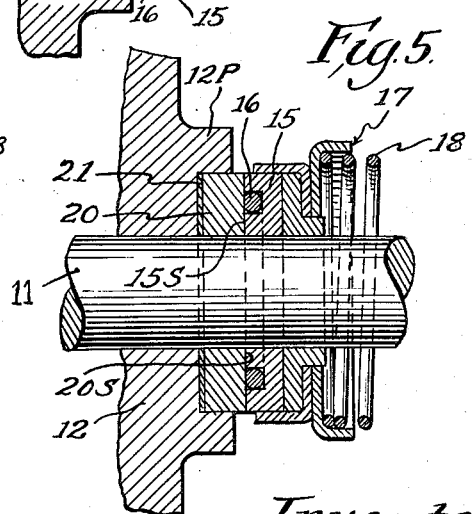
Inventor
Robert E. Moore.
By Mann, Brown and McWilliams
Attys.

United States Patent Office 3,108,816
Patented Oct. 29, 1963

3,108,816
MECHANICAL SEALING STRUCTURE FOR ROTATING SHAFTS
Robert E. Moore, Winnetka, Ill., assignor to Bell & Gossett Company, a corporation of Illinois
Filed Apr. 9, 1958, Ser. No. 727,465
3 Claims. (Cl. 277—93)

This invention relates to mechanical sealing structures and, more particularly, is concerned with providing an improved seal for rotating shafts.

The principal object of the invention is to provide a sealing structure that includes a conventional carbon ring seal that is protected by a seal provided by a ring of relatively hard lubric plastic material to serve as a barrier against the entrance of grit, water, and other foreign substances and also to act as a general lubricant for the sealing surfaces.

A further object is to provide a sealing structure the elements of which are rugged and quiet in operation.

Other objects and advantages will become apparent during the course of the following description.

In the accompanying drawings forming a part of this specification and in which like numerals are employed to designate like parts throughtout the same;

FIG. 1 is a sectional view through the sealing structure of the invention;

FIG. 2 is a sectional view taken on the line 2—2 of FIG. 1; and

FIGS. 3, 4 and 5 are fragmentary sectional views corresponding generally to that of FIG. 1 and illustrating various alternative constructional embodiments of the invention.

Referring to FIGS. 1 and 2, for purposes of disclosure the sealing structure is illustrated in association with a bracket 10 that may provide a connection with a motor mount or end bell (not shown). The bracket rotatably supports the drive shaft 11, which extends through a wall member 12 that is illustrated in the form of a cover plate suitably attached to the end face of the bracket 10 such that the cover plate 12 defines one of the end walls of a pump casing. A fragment of the pump impeller is shown at 13.

The sealing structure of the invention, as shown generally at 14, is arranged to provide a static and running seal between the shaft 11 and the end wall 12. The sealing structure includes a planar seal-face surface 12S provided on the end wall 12 in encircling relation to the shaft 11, a carbon ring 15 slidably mounted in encircling relation to the shaft and having a planar annular seal-face surface 15S for engagement with the seal-face surface 12S, a plastic ring 16 interposed between the carbon ring and the wall member, and a seal-mounting assembly 17 for the carbon ring and including a helical coil spring 18 encircling the shaft to compact the carbon ring axially against the seal-face surface 12S.

According to the invention the plastic ring 16 acts as a barrier protecting the cooperating seal faces against the entrance of grit or other foreign substances and also acts as a permanent lubricant for these sealing faces.

The physical mounting arrangement and location of the plastic ring may be variously modified after the manner illustrated in the various drawing figures. For example, in FIG. 1 the carbon ring 15 is formed with a concentric annular recess at its outer periphery with the plastic ring disposed in this recess in axial engagement between the carbon ring and the wall 12, as determined by the strength of the coil 17. In this arrangement both the carbon ring 15 and the plastic ring 16 acts directly against the wall of the casing.

As shown in FIG. 3, however, the wall of the casing may include an annular shoulder 12P forming a mounting pocket for the reception of a separate ring-shaped bushing 20 of hard, seal-face material. This bushing is preferably a high alumina-body ceramic suitably fixed within the pocket by cementing, as indicated at 21. The cement may be a thermo-setting epoxy resin-base adhesive and may have a film thickness on the order of .0015 to .003 inch. In this instance both the carbon ring 15 and plastic ring 16 are in sealing engagement with the annular seal-face surface 20S of the ceramic bushing, with the cement film 21 completing the seal with respect to the wall 12.

In another alternative arrangement, such as is shown in FIG. 4, the stationary ceramic bushing 20 may be provided with the recess for the plastic ring 16, with the seal face 15S of the carbon ring operating against both the ceramic bushing 20 and the plastic ring 16.

In still another arrangement, the plastic ring may advantageously be applied as an annular insert intermediate the inner and outer radial extremities of the usual seal faces, and while it may be located in either the carbon ring or the ceramic bushing, in FIG. 5 it is illustrated in a recess in the carbon ring to encircle at least a part of the seal face 15S thereof.

The plastic ring 16 of the invention is of a hard, lubric, seal-face material having a characteristically low coefficient of friction and is preferably made from a plastic that is characterized by the property of cold flowing or giving slightly under compression loading. One such plastic is described chemically as tetrafluoroethylene resin and is commonly known under the trademark "Teflon."

The plastic ring 16 preferably forms a press fit in its mounting recess to establish a snug-fitting mounting and if desired may be fixed in place by cementing with a suitable adhesive of the type mentioned above. It will be apparent that in each of these arrangements the plastic ring functions as a supplementary seal and, being disposed radially outwardly of the conventional sealing surfaces, serves as a barrier against the entrance of grit or scale between these surfaces. The lubric properties of the plastic ring provide a measure of lubrication and completely eliminate squeaky seals, which have been found to occur with annoying regularity in a small percentage of comparable types of prior art seals.

In the case of the use of Teflon or similar materials having a limited initial cold flow, the plastic ring is preferably slightly oversized and, as initially installed, projects slightly from its mounting recess and upon being compressed axially between the carbon ring and its mating sealing surface, the Teflon will initially yield a slight amount and undergo initial wear until the plastic ring, the carbon ring, and the wall 12 or bushing 20 interengage simultaneously and provide complementary sealing areas.

When using Teflon or similar material for the plastic ring, it preferably is restrained against radial outward flow by positive engagement therewith. In the case of the FIG. 1 and FIG. 3 arrangements, the extremity of a brass retainer flange 17F of the seal mounting assembly 17 partially surrounds the plastic ring 16 to partially restrain it against radial flow in response to compression loading thereof by the spring-pressed carbon ring. Similarly, in the arrangement of FIG. 4 the pocket-forming shoulder 12P preferably surrounds at least a part of the plastic ring to exert a similar radial restraint, while in FIG. 5 the plastic ring is inserted in the carbon ring intermediately in the seal face thereof and is restrained by the carbon ring itself.

It should be understood that the description of the preferred form of the invention is for the purpose of complying with Section 112, Title 35, of the U.S. Code and that the claims should be construed as broadly as prior art will permit.

I claim:

1. In a sealing structure, in combination: a casing having a stationary wall member of hard seal-face material to provide a planar annular seal face in concentric encircling relation to a rotatable shaft adapted to extend through said member, a seal assembly adapted for mounting on the shaft and including a graphite ring member providing a planar annular seal face in concentric encircling relation to the shaft and in axial engagement with the seal face of said wall member, one of said members having a concentric annular recess opening axially through the seal face thereof in encircling relation with at least a part of said last-mentioned seal face, and a one-piece ring of polytetrafluoroethylene in said recess in axial engagement between said members, to provide permanent lubrication between said seal faces for eliminating squeaking, said one member having an annular wall bordering the outer radial periphery of said recess to confine and restrain said polytetrafluoroethylene ring against radial outward flow thereof.

2. In a sealing structure, in combination: a casing having a stationary wall member of hard seal-face material to provide an annular seal face in concentric encircling relation to a rotatable shaft adapted to extend through said member, a seal assembly adapted for mounting on the shaft and comprising a graphite ring member to provide an annular seal face in concentric encircling relation to the shaft for axial abutment with the seal face of said wall member, and spring means for compacting said members axially to interengage the seal faces thereof, one of said members having a concentric annular recess opening axially through the seal face thereof in encircling relation with at least a part of said last-mentioned seal face, and a ring in said recess in axial engagement with said members to provide permanent lubrication between said seal faces for eliminating squeaking therebetween, said ring being of hard, lubric, plastic seal-face material such as polytetrafluoroethylene having a characteristically low coefficient of friction and having the property of undergoing limited cold flow deformation under load, said one member having an annular wall bordering the outer radial periphery of said recess to confine the last-named ring in tight-fitting relation in said recess and to restrain the last named ring against radial outward flow.

3. In a graphite ring rotary seal, the combination of a rotary shaft, a graphite ring member and a cooperating sealing ring member telescopically mounted on the shaft in spring biased abutting relationship to each other to provide a sealing face therebetween, said sealing face encircling said shaft, one of the members being stationary and the other rotatable with respect thereto, means for inhibiting passage of deleterious material radially across said sealing face between the periphery of the seal and the shaft, for lubricating said sealing surface, and for lengthening the life of the seal, said means including a ring of lubric material such as "Teflon" carried by one of said members in radially outwardly spaced encircling relation to the shaft and having an annular face thereof encircling the shaft and constituting part of the sealing face between the two members, and retaining means in encircling abutting relation about said ring of lubric material for limiting cold flow of said lubric material.

References Cited in the file of this patent
UNITED STATES PATENTS

| | | |
|---|---|---|
| 2,027,505 | Winkler | Jan. 14, 1936 |
| 2,149,975 | McCormack | Mar. 7, 1939 |
| 2,158,297 | Newill et al. | May 16, 1939 |
| 2,690,360 | Young | Sept. 28, 1954 |
| 2,833,213 | Kroekel et al. | Apr. 21, 1959 |
| 2,885,227 | Burger | May 5, 1959 |

OTHER REFERENCES

Product Engineering, July 1952, pages 168–173, Potential of Polyethylene by Henry Lee.